June 21, 1955
P. ROBINSON
2,711,498
ELECTRICAL CAPACITORS
Filed March 6, 1953
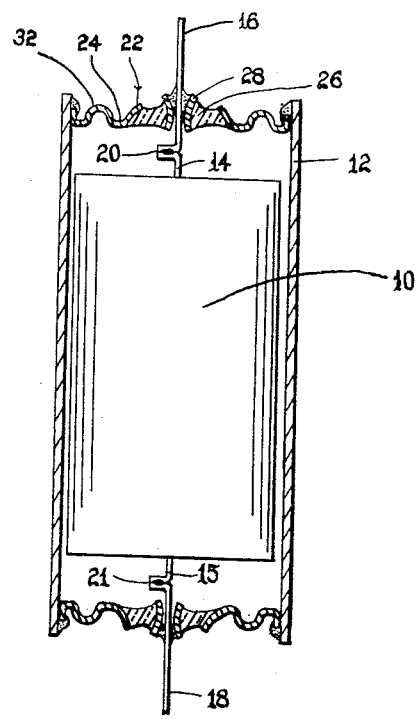
INVENTOR.
PRESTON ROBINSON
BY
HIS ATTORNEY

… … …

United States Patent Office 2,711,498
Patented June 21, 1955

2,711,498

ELECTRICAL CAPACITORS

Preston Robinson, Williamstown, Mass., assignor to Sprague Electric Company, North Adams, Mass., a corporation of Massachusetts Application March 6, 1953, Serial No. 340,720

4 Claims. (Cl. 317—258)

This invention relates to electrical capacitors and, more particularly, to a synthetic viscous oil particularly adapted for use as a dielectric in such capacitors. This application is in part a continuation of application Serial No. 725,281, filed January 30, 1947, and application Serial No. 175,437, filed July 22, 1950, which are now abandoned.

Synthetic oils are well-known additives for lubricating oils and the like and are produced by polymerization of ethylenically unsaturated compounds to molecular weights lower than those which result in solid compositions, varying from rubbery materials to hard brittle solids. Representative of these are the polymers of isobuylene and related olefins which are by-products obtained in the cracking of oil. Polymers of this type may be produced by polymerization of isobutylene at temperatures below 0° C. in the presence of boron trifluoride and similar catalysts. Typical polymerization reactions and products obtained thereby are described in U. S. Patents Nos. 2,226,589, 2,226,590 and 2,300,072, issued to W. H. Smyers as well as U. S. Patents Nos. 2,216,372 and 2,181,188.

The products obtained in these polymerization reactions varied in molecular weight from about 100 to as high as 50,000. The molecular weight products in the range of about 1000 to about 5000 were well saturated; in the lower end of the range they were viscous oils and in the upper part of the range they were plastic solids. These materials were proposed as modifiers for viscosity index and pour point of lubricating oils as well as for dielectric insulation material. Because of their high saturation, they were extremely resistant to oxidation and were ideal for a number of applications in which this property was important. However, it was found that their electrical properties were similar to those of natural mineral oils because of the similarity in chain construction and saturation.

Thus, these products were well adapted for many applications but could not compete, on a cost basis, with natural mineral oils as dielectric impregnants for electrical applications, such as condenser dielectrics, except where solid or elastic non-waxy characteristics were required.

It is an object of this invention to provide electrical condensers having dielectrics which are not subject to the disadvantages referred to above. A further object is to produce electrical condensers that have liquid dielectrics which posssess a solidifying point below minus 40° C. and an electrical resitivity higher than heretofore obtainable. Another important object is to produce liquid dielectric electrical capacitors of unusual stability which have extremely long operational life at temperatures in excess of 100° C., high capacity per unit volume and exceptionally high leakage resistance and breakdown strength over a wide operational temperature range. Additional objects will become apparent from the following description and claims.

These objects are obtained in accordance with the present invention by using condenser dielectrics comprising an unsaturated linear polymer of a major amount of monoolefins and a minor amount of diolefins, the polymer having an average molecular weight of between about 1200 and about 4200 and which has an iodine number between about 20 and about 70.

In a more restricted sense this invention is concerned with a condenser having a dielectric comprising an unsaturated liquid linear polymer of a mixture of a major amount of isobutylene, and a minor amount of diolefins, the polymer having an average molecular weight of which is between about 1200 and about 4200 and an iodine number between about 25 and about 65.

In one of its preferred embodiments this invention is concerned with a condenser having as a dielectric a porous sheet impregnated with an unsaturated liquid linear polymer of isobutylene with about 0.5 to about 10% diolefins by weight, the average molecular weight of the polymer being 2800 and 3500 and the iodine number of the polymer being between 30 and 50.

According to my invention I have found that synthetic oils produced by a polymerization of a mixture containing a major amount of olefins and a minor amount of diolefins at low or moderate temperatures in the presence of boron trifluoride, aluminum chloride and other halide catalysts possess unique dielectric properties. Among these unique properties which makes the aforementioned synthetic highly desirable as a liquid dielectric material are unusual resistance to oxidation during prolonged exposures in air at temperatures of 100° C. to 150° C., extreme stability to various chemical agents and exceptionally low sensitivity to the presence of water, a viscosity at 150° C. satisfactory for capacitor impregnation while still retaining the property of very high electrical breakdown strength, a wide usable liquid range of —55° C. to above 150° C. with no discontinuity of dielectric strength or dielectric constant thereover, a flash point in excess of 500° F. and a low vapor pressure. While I am not fully aware of the reasons therefor, it appears that my invention can be based upon either or both of the following theories. In known mineral oils and polymers of olefins the hydrogen ions normally present are extremely mobile due to their small size, while, at the same time, the negative ions are more or less immobile due to their high molecular weight. An alternative explanation of many of the novel dielectric properties of the new synthetic oil, particularly desirable in capacitor units, is that the presence of numerous unsaturated linkages in the liquid dielectric facilitates its acceptance of electrode-induced degradation products, one of the more important products being hydrogen. My synthetic oil apparently preferentially accepts this electrolytically generated hydrogen and thus acts as a synthetic liquid dielectric containing self-inhibiting properties while retaining its stability during the electrochemical reaction.

In accordance with my invention, I produce molecules which have the facility for ionic attachment of the mobile hydrogen ions to the double bonds occurring in the molecule. This results in a much larger ion and while it still is positive in nature, the large molecular weight thereof renders the ion immobile and results in a much higher electrical resistivity. In the practice of my invention, therefore, unsaturated linear polymers which have an iodine number between about 20 and about 70 are used. I have discovered that the advantages of such structural arrangements are practically apparent only in a limited molecular range, where the average molecular weight is between about 1200 and about 4200. Products having average molecular weights above this range do not possess as desirable properties and those below this range are too small in molecular size to produce the immobile positive ions which appear to be essential for the unpredictably high resistivity values I have obtained.

Ingredients having a molecular weight below 1200 appear to generate more mobile ions and/or are less efficient as self inhibitors. Therefore, it is preferred that such ingredients be present only in minor amounts. Also no molecules of molecular weight less than about 450 should be present in any reasonable amount. Since the extremely high molecular weight molecules contribute little in the way of beneficial activity, I prefer to eliminate them in order to maintain as low a pour point as possible. However, they are not as detrimental as the low molecular weight materials and may be present in small quantities.

I have found by determination of saturation that the dielectric compounds of my invention may best be expressed in terms of iodine number, as measured by Wijs' method. This iodine number should be between about 20 and about 70 and, according to the preferred embodiment of the invention, should be between 30 and 50. The number of carbon atoms in the molecule should average about 82 to about 300 and the number of double bonds in the molecule should range from about 2 to about 11 for optimum resistivity values.

While I have mentioned isobutylene as the predominant and preferred material, my invention may also be practiced with normal and isomeric alkylenes having less than twelve carbon atoms such as ethylene, propylene, amylene, higher olefins and mixtures thereof. Together with the olefins mentioned above, a minor amount of a diolefin is present in the polymerization mixture. The percentage of diolefin content, based upon the total of unsaturated components, should be from about .5% to about 10%. While it is known that, for example, isobutylene and 1,3-butadiene, which is a diolefin with conjugated double bonds, may be copolymerized to form solid, rubbery products, the present invention is directed to dielectrics which are liquid and have a relatively high unsaturation, both double bonds of the diolefin not being completely saturated during the polymerization process. Unconjugated diolefins can also be used to supply substantially all or part of the desired unsaturation.

The diolefins used in the invention are readily obtained as by-products in petroleum cracking processes. They have been considered more or less useless per se, because of their gum-forming tendencies in combustion engines and thus have generally been hydrogenated and used in further gasoline processing steps. Among the diolefins which may be used in accordance with the present invention are the following:

Butadiene-1,3
Butadiene-1,2
Beta-methyl butadiene-1,3
Alpha-methyl butadiene-1,3
Diisopropenyl
1,1,3-trimethylbutadiene-1,3
Pentadiene-1,4
Hexadiene-1,5
2,5-dimethyl hexadiene-1,5
1,1,5-trimethyl hexadiene-1,5
Octadiene-1,4

The polymerization components may be mixed with saturated equivalents, such as n-butane, iso-butane, propane, pentane, hexane, octane, etc. since the presence of a diluent makes handling and processing much simpler. These saturated hydrocarbons are present in the topping gases which form a source of raw material for the olefinic components of the polymerization mixture.

The polymerization temperature is advisably kept below about 100° C., and since high molecular weight products are not desired, need not be below 0° C., although the reaction will proceed favorably at temperatures below 0° C. The catalysts for polymerization may be used singly or in combination. Aluminum chloride, boron trifluoride and the like are suitable metal halide catalysts.

In accordance with one of the preferred embodiments of the invention, the polymerization is conducted in the presence of catalysts which either inhibit ring formations or crack formed rings. Alumina-silica catalysts are useful for this purpose and may be present in an amount varying from 1 to 10 percent by weight of the polymerization catalyst. In this manner, a substantially linear polymer can be produced and the presence of undesirable rings is substantially prevented.

As a representative example of the process for producing a polymer having the novel electrical characteristics mentioned, the following mixture was subjected to polymerization in the presence of boron trifluoride, and a small amount of finely ground alumina:

|  | Percent |
|---|---|
| Alkanes | 58 |
| Propylene | 6 |
| Iso-butylene | 26 |
| n-Butene | 4 |
| Hexadiene-1,5 | 1 |
| Alpha-methylbutadiene-1,3 | 1 |
| Higher olefins | 4 |

The mixture was agitated in a closed chamber and held at a temperature between 30° C. and 60° C. by means of cooling coils for a period of two hours. The top layer was decanted from the tarry residue and the alkanes and unpolymerized olefins distilled off, leaving a very viscous, slightly amber oil.

After refining by filtration over fuller's earth, the viscous oil was found to have a solidification point below —40°, an iodine number of 41.5 and a poor viscosity index, that is a viscosity which undergoes rapid changes with changes in temperature. The average molecular weight was about 3100.

The conventional polymers, described in the patents referred to above, may be converted into the desirable viscous dielectric oils of the invention with an iodine number in the range specified by treatment at elevated temperatures, and some at elevated pressures, in the presence of dehydrogenation catalysts, particularly oxides of the transition metals of the 4th, 5th and 6th groups of the periodic table, suspended on suitable supports, such as alumina. The temperatures employed may be from over 125° C. to about 700° C. and the polymer should be diluted with an inert material for the processing step. Rapid passes of polymer over hot catalyst are required to prevent appreciable depolymerization. The pressure may be from about 1 to about 50 atmospheres.

According to a further embodiment of my invention, mixtures of the preferred oils with saturated mineral oils may be employed as dielectrics. This mixture should possess an iodine number between about 15 and 40 for optimum results. It is a simple matter to calculate the mixture ratio from the iodine number of the unsaturated polymer.

The synthetic dielectrics of the present invention possess the further advantages of extremely low solidifying and pour points. This pour point is less than for comparable saturated polymers of isobutylene and other olefins, as well as natural mineral oils. Representative materials with an average molecular weight of about 3000 and an iodine number of about 41 possess a solidifying point slightly below minus 55° C., and even at this temperature do not form a wax. The more saturated high molecular weight synthetic oils and natural oils solidify at appreciably higher temperatures, and have a waxy, crystalline structure when they solidify. Concurrent with or shortly above this solidification temperature the dielectric constant and dielecertic strength rapidly diminish. As a result, they are unsatisfactory for use in capacitors which may be subjected to temperatures in this low range, such as the electronic equipment of airplanes operating at very high altitudes, while capacitors of this invention are operable with virtually no change in capacity to —55° C.

The greater viscosity of prior art synthetic oils of comparable molecular weight prevented their satisfactory incorporation in capacitors and related devices. In many cases it was necessary to employ a solvent to obtain the complete saturation of calendered paper which is necessary in electrical condensers of the type having impregnated paper dielectric spacers. The presence of a solvent is undesirable because upon evaporation it leaves voids in the dielectric. I have found that the dielectrics of the present invention possess the advantage of a very low viscosity at elevated temperatures permitting rapid impregnation with 100% polymer at temperatures of 100° C.

The resistivity of the viscous oil obtained in the example previously given was $2,440,000 \times 10^9$ ohm-cm. at 125° C. No other known natural or synthetic oil, as far as I am aware, possesses a resistivity even one-tenth as high at 125° C., and, for the matter, it is doubtful that any such oils possess this high a value even at 100° C.

The high resistivity greatly reduces the leakage currents of condensers in which they are used. This is especially important where the condensers are used at high temperatures and the dissipation of heat is a serious problem. Leakage currents contribute a significant amount of the heat required to be dissipated so that less leakage enables operation at higher temperatures. The following data represents a comparison of the insulation resistance at various temperatures of several commercially important capacitor impregnants with the inventive synthetic oil disclosed above:

| Temperature, ° C. | Impregnants (Insulation Resistance* In Megohm X Microfarads) | | | | |
|---|---|---|---|---|---|
| | Synethic polymer | Mineral Oil | Halowax | Vegetable Oil | Arochlor |
| 25 | 21,000 | 2,000 | 1,000 | 500 | 1,500 |
| 50 | 2,300 | 300 | 150 | 80 | 250 |
| 85 | 500 | 20 | 8 | 5 | 15 |
| 100 | 300 | | | | |
| 125 | 42 | | | | |

*Resistance characteristics as measured after a two-minute charge at 180 v. D. C.

Referring to the appended drawing a convolutely wound capacitor section 10, consisting of two electrode foils separated by dielectric spacer material is housed within an open ended tubular metal casing 12. The capacitor section preferably consists of aluminum, lead, copper or tin foils separated by a thin calendered kraft paper dielectric spacer material. Flat, flexible metallic electrically conducting tabs 14 and 15 are wound into the capacitor section so as to electrically contact the respective capacitor electrodes and so as to extend from opposite ends of the section. Electrically conducting terminal leads 16, 18 are then spot welded at 20 and 21 to tabs 14 and 15, respectively, and the terminated capacitor section is inserted in metallic casing 12. End caps 22 and 23 are then inserted over the leads at each end of the metallic casing. These caps preferably consist of a metallic collar 24, a glass insulation portion 26 fused to collar 24 and to a central metallic eyelet 28 constructed as illustrated. The ends of casing 12 are soldered to the periphery of end caps 22 and 23 and the assembly is then ready for impregnation. In production, one end of the unit is sealed by soldering the lead to the eyelet through which it emerges, and the eyelet at the other end of the unit is left unsoldered to allow for penetration of the impregnant. After impregnation, which can be effected in any desired manner, the remaining eyelet is solder sealed preferably while the casing 12 is completely filled with the impregnant. Ridges 32 may be provided in metal portion 24 of end cap 22 to provide for expansion and contraction of the impregnant with changes in temperature. For some uses one foil of the capacitor section may be directly connected to one end cap 22 or 23, as by making this cap entirely of metal, without using glass or insulating portions. Suitable vacuum impregnation methods are well-known to the art.

A capacitor of the construction illustrated was impregnated with the dielectric material disclosed herein as a representative example. The capacitor section consisted of 88 turns of 2 superimposed aluminum foils 0.2 mil thick and ¾ inch wide separated by layers of 0.25 mil thick and 1³⁄₁₆ inch wide calendered kraft paper having a density of from about 0.97 to about 1. The capacitor section was convolutely wound upon a mandrel ⅛ inch in diameter, and a margin of ³⁄₃₂ inch was left at each longitudinal edge of the winding. This capacitor unit was rated at 0.1 microfarad and 400 volts. The measured leakage resistance at 125° C. after a one minute charging period was 511 megohms, thus giving a megohm microfarad product of 50. Such exceptional leakage resistance characteristics at 125° C. have heretofore been unattainable in oil impregnated paper capacitors.

Capacitors of similar construction were impregnated with the dielectric materials disclosed herein and subjected to prolonged exposure at elevated temperature. To determine the stability of these units during these periods of exposure, the units were measured for leakage resistance periodically throughout the testing period and the results are hereinafter set forth.

*Resistance \*leakage (megs.)*

| No. | Temperature | Hours | | | | |
|---|---|---|---|---|---|---|
| | | 0 | 24 | 120 | 200 | 264 |
| (1) | 85° C. | 110 | | | 110 | |
| (2) | | 98 | | | 100 | |
| (3) | 100° C. | | 82 | 78 | | 78 |
| (4) | | | 82 | 82 | | 82 |

*Resistance characteristics as measured after a two-minute charge at 180 v. D. C.

From this representative data it is readily seen that the dielectric impregnant is characterized by an extreme degree of stability toward prolonged exposure to elevated temperatures and the capacitor prepared therefrom has a very high leakage resistance which remains constant over this prolonged time of exposure.

Additional units similar in construction to the capacitor set forth as the representative example were impregnated with various dielectric materials for comparison of their electrical properties. In addition to the dielectric material disclosed herein, units were impregnated with the dimer of dihydronaphthalene disclosed in the Ruben U. S. Patent No. 2,235,566, issued March 18, 1941, and with purified castor oil the preparation of which is set forth in the Goggins et al. U. S. Patent No. 2,418,820, issued April 15, 1947. These three impregnants were examined as to the capacity of the units, the leakage resistance, and power factors at various temperatures, the results of which are set forth below:

Exhibit A

| Unit | Ruben Dimer | | | Goggins et al. Purified Castor Oil | | | Dielectric Comprising Inven. as set forth in this application | | |
|---|---|---|---|---|---|---|---|---|---|
|  | Cap. (mf.) | Percent Power Factor | Leakage Resistance, Megs.* | Cap. (mf.) | Percent Power Factor | Leakage Resistance, Megs.* | Cap. (mf.) | Percent Power Factor | Leakage Resistance, Megs.* |
| 25° C.— 1 | .670 | .22 | 26,000 | 1.05 | .72 | 1,350 | .700 | .24 | 32,000 |
| 2 | .680 | .18 | 22,000 | 1.00 | .82 | 1,300 | .695 | .20 | 28,000 |
| 85° C.— 1 |  |  | 500 |  |  | 50 |  |  | 780 |
| 2 |  |  | 450 |  |  | 50 |  |  | 600 |
| 100° C.— 1 |  |  | 220 |  |  | 13 |  |  | 420 |
| 2 |  |  | 220 |  |  | 11.5 |  |  | 420 |
| 125° C.— 1 | .722 | 2.08 | 36 | 10.7 | 12.8 | 2.2 | .715 | .29 | 64 |
| 2 | .730 | 2.45 | 40 | 10.1 | 11.7 | 2.3 | .711 | .31 | 60 |

*Leakage resistance determined on a 180 volt bridge after a two-minute charge.

The results of this comparison conclusively show that the condenser dielectric oils disclosed in the Goggins et al. patent, 2,418,820 and the Ruben patent, 2,235,566, are not as good for capacitor use and are much inferior for operational use at elevated temperatures above 100° C. as compared with the capacitor impregnated with the dielectric material of the present invention.

It was found in the utilization of this capacitor impregnated with the novel dielectric material that the temperature coefficient of the dielectric constant over the audio frequency range is quite uniform for the wide operational temperature range of —55° C. to 150° C. and that it is further distinguished with negligible losses resulting in a very low power factor capacitor.

It has been further found, in accordance with present invention, that improved high temperature characteristics may be obtained in dielectric oil impregnated capacitors if the unit is solder sealed while it is at a temperature close to and preferably somewhat above the rated temperature of operation. The temperature coefficient of capacity shown by the above condenser is exceptional over the entire operating temperature range of —55° C. to at least 125° C. A unit of this type will have a capacity value which at 1000 cycles will not vary more than about —5½% to about +2½% from the 25° C. value between —60° C. and +85° C.

The capacitors of the invention may be operated at temperatures as high as 150° C. without failure for extended periods e. g. at least 100 to 160 hours, at rated D. C. voltage.

As many apparently widely different embodiments of this invention may be made without departing from the spirit and scope hereof it is to be understood that the invention is not limited to the specific embodiments hereof, except as defined in the appended claims.

What is claimed is:

1. A new and improved electrostatic capacitor capable of operation at 150° C. for extended periods which comprises electrode elements of opposite polarity separated by a paper spacer impregnated with a synthetic liquid dielectric, consisting essentially of an unsaturated linear hydrocarbon polymer of a mixture of monolefins having less than 12 carbon atoms with from about 0.5 to about 10% of diolefins, said linear unsaturated polymer having an iodine number between about 20 and about 70 as determined by Wijs' method and having an average molecular weight between about 1200 and about 4200, said liquid unsaturated polymer containing substantially no molecules having a molecular weight of less than 450.

2. A new and improved electrostatic capacitor capable of operation at 150° C. for extended periods which comprises electrode elements of opposite polarity separated by a paper spacer impregnated with a synthetic liquid dielectric, consisting essentially of an unsaturated linear hydrocarbon polymer of a mixture of monolefins having less than 12 carbon atoms with from about 0.5 to about 10% of diolefins, said linear unsaturated polymer having an iodine number between about 30 and about 50 as determined by Wijs' method and having an average molecular weight between about 2800 and about 3500, said liquid unsaturated polymer containing substantially no molecules having a molecular weight of less than 450.

3. A new and improved electrostatic capacitor capable of operation for extended periods at elevated temperatures above 100° C. possessing at least two metal electrodes of opposite polarity separated from one another by a porous spacer material, said porous spacer material being impregnated with a dielectric oil consisting essentially of a mixture of a refined mineral oil and a liquid unsaturated linear hydrocarbon polymer of a mixture of isobutylene with from about 0.5 to about 10% of diolefins, said substantially linear polymer possessing an average molecular weight of about 2800 and 3500 and an iodine number between about 30 and about 50 as determined by Wijs' method, said mixture of mineral oil and liquid unsaturated linear polymer possessing an iodine number between about 15 and about 40.

4. A new and improved electrostatic capacitor capable of operation at 150° C. for extended periods which comprises electrode elements of opposite polarity separated by a paper spacer impregnated with a syntheic liquid dielectric, consisting essentially of an unsaturated linear hydrocarbon polymer of a mixture of isobutylene with from about 0.5 to about 10% of diolefins, said linear unsaturated polymer having an iodine number between about 20 and about 70 as determined by Wijs' method and having an average molecular weight between about 1200 and about 4200, said liquid unsaturated polymer containing substantially no molecules having a molecular weight of less than 450.

References Cited in the file of this patent

UNITED STATES PATENTS

| | | |
|---|---|---|
| 2,145,350 | Haslam | Jan. 31, 1939 |
| 2,151,382 | Harmon | Mar. 21, 1939 |
| 2,235,566 | Ruben | Mar. 18, 1941 |
| 2,274,031 | Bannon | Feb. 24, 1942 |
| 2,418,820 | Coggins | Apr. 15, 1947 |